3,393,050
RECOVERY OF FREE SULFUR FROM HYDROGEN SULFIDE-CONTAINING GAS
Elton B. Hunt and Russell L. McGalliard, Tulsa, Okla., assignors to Pan American Petroleum Corporation, Tulsa, Okla., a corporation of Delaware
Filed Apr. 22, 1966, Ser. No. 544,428
9 Claims. (Cl. 23—225)

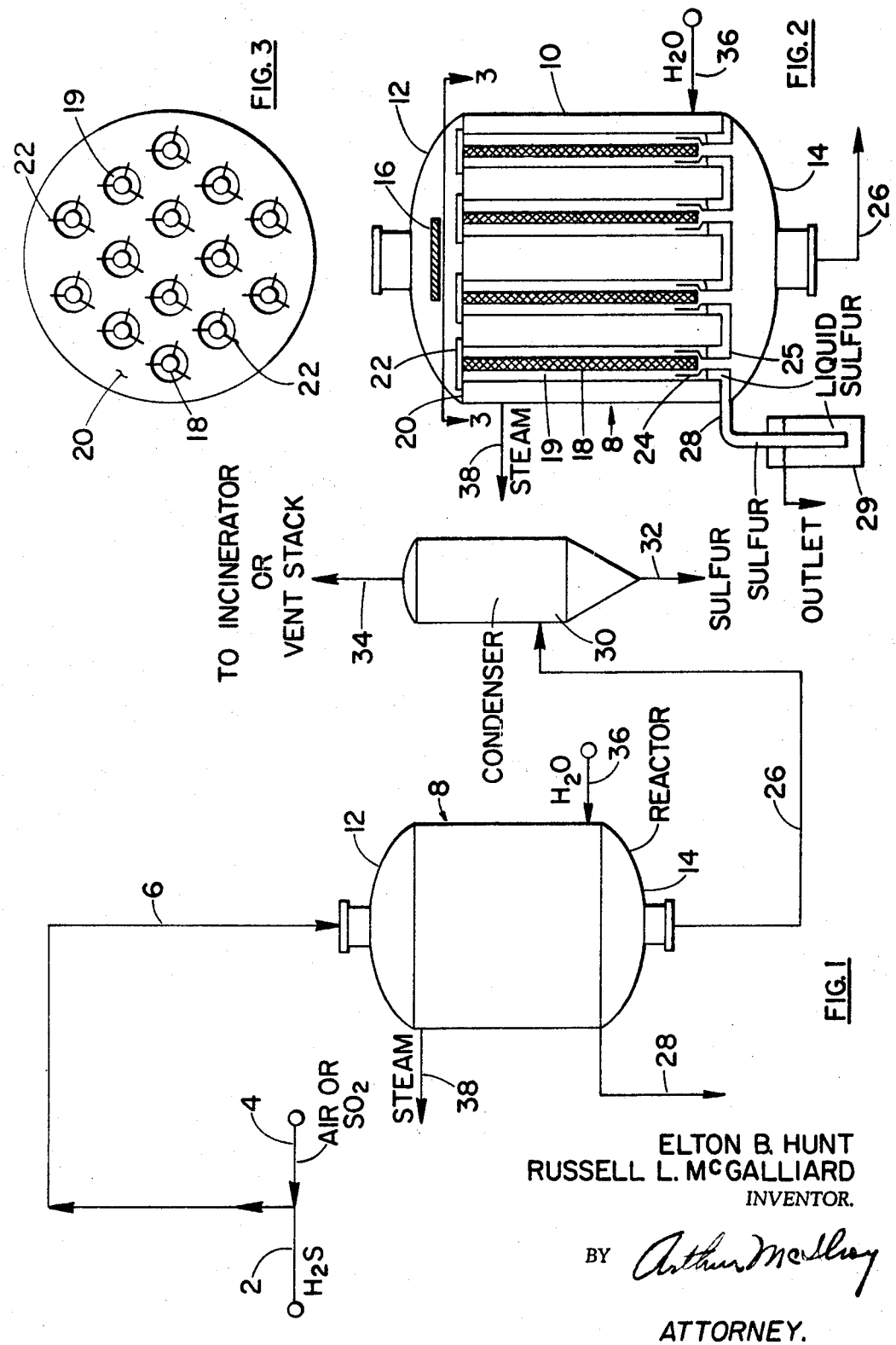

ABSTRACT OF THE DISCLOSURE

This invention contemplates a method and apparatus for the catalytic conversion of hydrogen sulfide into free sulfur by the use of an oxidizing gas, such as oxygen or sulfur dioxide, under conditions such that the heat generated by the resulting reaction and the product sulfur thus formed are removed simultaneously from the reaction zone. Otherwise stated, the heat of reaction and product sulfur, the latter being in the form of a liquid, are removed from the gaseous reaction phase at the same time, thereby favoring the driving of the reaction to substantial completion.

---

The present invention relates to the art of producing elemental sulfur from hydrogen sulfide. More particularly it is concerned with a novel concept by which the involved reaction is effected under conditions such that maximum conversion of the hydrogen sulfide to the free sulfur is secured.

Briefly our invention contemplates a method and apparatus for the catalytic conversion of hydrogen sulfide into free sulfur by the use of an oxidizing gas, such as oxygen or sulfur dioxide, under conditions such that the heat generated by the resulting reaction and the product sulfur thus formed are removed simultaneously from the reaction zone. Otherwise stated, the heat of reaction and product sulfur, the latter being in the form of a liquid, are removed from the gaseous reaction phase at the same time, thereby favoring the driving of the reaction to substantial completion. Thus, by providing conditions permitting the reaction to proceed essentially to completion, considerably higher conversions can be secured than with conventional methods which remove product sulfur and heat of reaction in downstream process equipment.

One of the principal disadvantages with modern methods for the recovery of free sulfur from hydrogen sulfide—at least from an economic standpoint—is that they require the use of a furnace, catalytic reactors and associated heat exchangers. The furnace is employed to partially oxidize the hydrogen sulfide fed to the system to free sulfur and/or sulfur dioxide. Such equipment is costly and complicated. Also, catalytic reactors and heat exchangers for this type of operation represent a substantial investment. While in the direct (catalytic) oxidation process no furnace is involved, two or more catalytic reactors, with associated heat exchangers, are required.

Accordingly, it is an object of our invention to provide a means whereby the use of a furnace in the conventional sulfur plant can be avoided. It is another object of our invention to replace the less efficient Claus reactor in a conventional sulfur plant with a reactor embodying the features of our invention. It is still another object of our invention to provide a means by which a wider concentration range of hydrogen sulfide-containing gases can be subjected to the direct oxidation method.

In the accompanying drawings:

FIGURE 1 is a diagrammatic representation of a plant employing the novel reactor system of our invention.

FIGURE 2 is a sectional view of a reactor employing the novel features of the present invention.

FIGURE 3 is a plan view of the reactor shown in FIGURE 2 taken along line 3—3.

Referring again to FIGURE 1, gas containing hydrogen sulfide coming either from an amine scrubber or from the field in the form of a sour natural gas flows through line 2, combined with air or sulfur dioxide (depending on the source of the plant feed) in line 4 and then run into line 6 where the gases are thoroughly mixed prior to introduction into reactor 8.

The feed to the reactor also may be derived from a plant using the so-called "split flow" process. The latter is usually employed where the hydrogen sulfide content of the gas is below about 40 percent. In such cases enough of the raw gas is fed to a furnace or boiler to convert one-third of the hydrogen sulfide in the total feed to sulfur dioxide. The sulfur dioxide thus formed is then combined with the remaining two-thirds of the feed stream, mixed, and sent to reactor 8. Alternatively, in a case where all the feed gas is sent through the furnace, i.e., the gas has a hydrogen sulfide content in excess of about 40 percent, the furnace effluent after the free sulfur has been removed therefrom constitutes a source of hydrogen sulfide and sulfur dioxide in reacting proportions and may be fed through line 6 to reactor 8. In other words, our invention may be employed in conjunction with the operation of any sulfur furnace by replacing the conventional Claus reactors with the type of reaction unit described and claimed herein.

Reactor 8, as may be seen from FIGURE 2, is composed of a cylindrically shaped body portion 10 having upper and lower end caps 12 and 14, respectively. Immediately below the feed inlet is a baffle 16 which serves to secure a more even distribution of the reactant gases. Catalyst baskets 18 are suspended in passageways 19 from upper tube sheet 20 by means of spider supports 22. At the base of the catalyst baskets are gas-liquid disengaging elements 24 affixed to a lower tube sheet 25, which permit the unreacted gaseous components along with gaseous reaction products to be conducted out of the lower portion of the reactor via line 26. Liquid product sulfur is removed from the reactor through line 28 and seal pot 29. Any uncondensed product sulfur is taken from reactor 8 at about 300°–400° F. through line 26 and sent to condenser 30 operated at about 250° to 300° F. where the sulfur is converted to liquid form and withdrawn through line 32. The uncondensed gaseous fraction is taken off overhead through line 34 and sent either to an incinerator or vent stack, not shown.

Feed to reactor 8 originating from a furnace wherein either all or only a part of the gas is sent through it need not be preheated. On contact of these gases which are at a temperature of about 350°–450° F., with the catalyst in wire baskets 18, reaction is initiated and heat is generated rather rapidly. Turbulent gas flow in the annuli between baskets 18 and passageways 19 transfers reactant gases to the catalyst surface and products to the cold walls of passageways 19 for heat removal and sulfur removal by condensation. In this connection reactor 8 may be water cooled with steam taken off therefrom at about 50 p.s.i. (300° F.) via line 338 and makeup water added through line 36. The wall temperature of passageways 19 generally ranges from about 250°–320° F. Catalyst in wire baskets 18 is cooled by radiation and convection. However, it is maintained at a temperature safely above the sulfur dew point of the process gases. Product sulfur condensed on the walls of passageways 19 collects on lower tube sheet 25 and is removed through line 28.

In a majority of instances with the reactor system of our invention, conversion of the hydrogen sulfide to free sulfur can be effected by the direct oxidation process. This is one of the outstanding advantages of the present invention because it renders possible a much wider range of hydrogen sulfide-containing feeds that can be subjected to the direct oxidation method. In the past, hydrogen sulfide concentrations of not more than about 15 percent were considered the practical upper limit for the direct oxidation process. With the present invention it is possible, because of the highly efficient heat and liquid sulfur removal means, to subject substantially pure hydrogen sulfide to the partial oxidation process. Temperatures should not be allowed to exceed about 1200° F. in this particular process since we have observed that over prolonged periods at higher temperatures, the activity of the catalyst becomes impaired. Also, it should be pointed out that when hydrocarbons are present, especially the higher ones such as propane through decane, reaction temperature should not be permitted to exceed about 900° F. If the temperature goes much above 900° in such cases, not only is the product sulfur of poor quality but the catalyst becomes deactivated in a short time under these conditions.

In carrying out the direct oxidation process in accordance with our invention, the feed may or may not be externally preheated. If no external preheat is used then the catalyst basket should be somewhat longer so that the upper portion of the passageway can serve as a preheater. Whether or not preheating of the reactant gases is accomplished in this way or by conventional means is a matter of economics. If the preheating step is to be effected in the reaction vessel itself, longer columns of catalyst should be employed. Excessive length of the catalyst baskets is not considered critical since if the reactant gases become depleted with respect to hydrogen sulfide, sulfur dioxide, or oxygen, the lower portion of the catalyst is not used and has no harmful effect on the products. Also in the event the upper portion of the catalyst column becomes inactivated, owing to overheating, excessive carbon deposition, etc., the remaining unaffected portion of the catalyst serves to aid in driving the desired reaction to completion. In fact, each of these columns of catalyst in perforated tubes or wire baskets 18 may be considered as a continuum of reaction equilibrium zones. This is for the reason that as the rich reactant gases contact the upper region of the catalyst column, a certain amount of sulfur and heat are produced. Both the sulfur and generated heat are removed at the same time from the reaction zone through condensation of the sulfur vapors into a liquid product on the walls of passageways 19 and by transfer of the heat through said walls into the cooling medium. This procedure is repeated as the gaseous reaction mixture flows downwardly in contact with the catalyst. With the removal of both the heat and liquid product sulfur simultaneously from the reaction zone, it will be seen that the remaining gaseous reactants are placed in a new environment essentially free of product sulfur and excessive heat, a condition which favors the desired reaction going much more nearly to completion than is the case with the conventional Claus and direction oxidation reactors in which neither heat or product sulfur is removed.

Any of the conventional catalysts such as bauxite, alumina, etc., may be used. In some cases it may be desirable to employ a more reactive catalyst, i.e., one operable at the lower temperatures, e.g., 250° F., such as the aluminum silicates as disclosed in U.S. 2,971,824 to Johnson et al., or various of the calcium aluminum silicate complexes.

The velocity of the gaseous reaction mixture through the annular spaces between the catalyst column and the passageway walls should be sufficient to maintain a high degree of turbulence, but insufficient to entrain liquid product sulfur. Normally, free area mass velocities of from about 1–10 lbs./sec./sq. ft. are adequate.

From the foregoing discussion and accompanying drawings it will be seen that a number of advantages are provided by our invention. Thus, the reactor of our invention is designed so that the reactant gases contact the catalyst by turbulent transport spreading out the reaction zone and avoiding excessive catalyst temperatures. The annular space between the catalyst basket and the passageway wall prevents excessive catalyst cooling with attendant sulfur deposition and catalyst deactivation. Such an arrangement also results in a low pressure drop system.

We claim:
1. In a reaction vessel for the conversion of hydrogen sulfide into free sulfur, the combination comprising a plurality of elongated open-ended chambers therein, a column of catalyst for said conversion in each of said chambers and defining an annular space between each of said columns and the walls of each of said chambers, cooling means in cooperation with each of said chambers adapted to remove product sulfur and generated heat simultaneously from the catalyst in each of said chambers, and means at the lowermost end of said chambers for disengaging liquid from gaseous components.

2. The reaction vessel of claim 1 wherein the columns of catalyst are packed in a perforated container suspended in each of said chambers.

3. The reaction vessel of claim 2 wherein said gas-liquid disengaging means surrounds the lower end of said catalyst column and is affixed to a tube sheet below said chambers and extending to the walls of said vessel.

4. A method for the catalyst conversion of hydrogen sulfide to free sulfur in a reaction zone which comprises:
(1) contacting a portion of a body of catalyst for said conversion with a mixture of hydrogen sulfide and an oxidizing gas in reaction proportions at temperature below about 1200° F. to produce free sulfur in vapor form and heat of reaction,
(2) simultaneously contacting the resulting sulfur vapors with a cooled surface surrounding and adjacent said reaction zone to convert said vapors to liquid and transfer said heat of reaction to said surface,
(3) recontacting the remaining gaseous reactants, essentially free of product sulfur and excessive heat with said catalyst body,
(4) repeating the conditions of steps 1 and 2.

5. The method of claim 4 wherein the heat of reaction and product sulfur are removed from said zone by means of indirect heat exchange at a heat sink temperature ranging from about 250° to about 320° F.

6. The method of claim 4 in which the oxidizing gas is oxygen.

7. The method of claim 4 wherein the hydrogen sulfide is mixed with normally gaseous saturated hydrocarbons and the temperature does not exceed about 900° F.

8. The method of claim 4 wherein the oxidizing gas is sulfur dioxide.

9. The method of claim 4 in which the hydrogen sulfide is derived from a gas sweetening system.

References Cited

UNITED STATES PATENTS

| | | | |
|---|---|---|---|
| 1,580,740 | 4/1926 | Legg | 23—288 |
| 1,922,872 | 8/1933 | Thompson | 23—225 |
| 2,630,374 | 3/1953 | Miller | 23—225 |
| 2,645,566 | 7/1953 | Stookey | 23—288 |
| 2,760,848 | 8/1956 | Dunning | 23—225 |

OSCAR R. VERTIZ, *Primary Examiner.*

MILTON WEISSMAN, *Examiner.*

G. PETERS, *Assistant Examiner.*